United States Patent [19]

Fujiwara et al.

[11] Patent Number: 4,985,891
[45] Date of Patent: Jan. 15, 1991

[54] ISDN SYSTEM HAVING SUBSCRIBER LINE MULTIPLEXER WITH MEANS FOR ESTABLISHING DIFFERENT DATA LINKS THROUGH D-CHANNELS ON SUBSCRIBER LINE AND HIGH RATE TRANSMISSION LINE

[75] Inventors: Ryuhei Fujiwara; Yasuo Fukazawa, both of Tokyo; Takashi Asano, Miyagi, all of Japan

[73] Assignee: NEC Corporation, Tokyo, Japan

[21] Appl. No.: 290,953

[22] Filed: Dec. 28, 1988

[30] Foreign Application Priority Data

Dec. 28, 1987 [JP] Japan .................................. 62-332813
Jan. 18, 1988 [JP] Japan .................................. 63-7040
Jan. 22, 1988 [JP] Japan .................................. 63-10867
Oct. 6, 1988 [JP] Japan .................................. 63-250751

[51] Int. Cl.$^5$ .............................. H04J 3/12; H04J 3/26
[52] U.S. Cl. .................................... 370/110.1; 370/84
[58] Field of Search .............. 370/110.1, 94.1, 60, 370/84, 112, 58.1, 58.2, 58.3; 379/93, 94

[56] References Cited

U.S. PATENT DOCUMENTS

| | | | |
|---|---|---|---|
| 4,700,340 | 10/1987 | Beranek et al. | 370/60 |
| 4,736,364 | 4/1988 | Basso et al. | 370/110.1 |
| 4,805,167 | 2/1989 | Leslie et al. | 370/110.1 |
| 4,821,265 | 4/1989 | Albal et al. | 370/94.1 |

*Primary Examiner*—Douglas W. Olms
*Assistant Examiner*—Min Jung
*Attorney, Agent, or Firm*—Sughrue, Mion, Zinn, Macpeak & Seas

[57] ABSTRACT

In an ISDN system comprising a plurality of DSLs each having a plurality of DTEs and an ISDN switch having a TEI list, a multiplexer is used for enabling each DTE to access the ISDN switch through a single primary rate DTL in the time division technique. The multiplexer comprises subscriber interfaces connected to DSLs, respectively. The subscriber interface has first TEIs assigned to DTEs on the corresponding DSL and has a first data link with each DTE on the basic interface D channel using a first LAPD frame signal with the first TEIs. The subscriber interface has a second TEI assigned thereto and registered in the TEI list in the ISDN switch. The subscriber interface derives information field from the first LAPD signal and forms a second LADP frame signal having the second TEI and the derived information. The multiplexer statistically multiplexes a plurality of second LAPD signals from subscriber interfaces into the D channel on the DTL to form a second data link between each subscriber interface and the ISDN switch so that load of the ISDN switch is reduced. Addition of a switch selection code to the second TEI enables to switch the multiplexer to another ISDN by use of a cross-connector on the DTL. Use of line selecting signal in DTE signal also enables the multiplexer to transmit the DTE signals onto a different private line.

6 Claims, 11 Drawing Sheets

ISDN SYSTEM HAVING SUBSCRIBER LINE MULTIPLEXER WITH MEANS FOR ESTABLISHING DIFFERENT DATA LINKS THROUGH D-CHANNELS ON SUBSCRIBER LINE AND HIGH RATE TRANSMISSION LINE

BACKGROUND OF THE INVENTION

1. Field of the Invention

The present invention relates to an integrated services digital network (ISDN) system according to recommendations of the CCITT (International Telegraph and Telephone Consultative Communication) and, in particular, to subscriber line multiplexing for multiplexing signals, particularly, control signals on a plurality of subscriber lines on a high rate digital transmission line extending to an ISDN digital switch.

2. Description of the Prior Art

In the ISDN system, a plurality of subscriber lines extend from an exchanging office to user areas. Each subscriber line terminates to a network termination (NT) unit. A user bus is connected to the NT unit and extended in the user area. One or more user's equipments or terminal equipments (TEs) such as a digital telephone set or sets (which will only be called telephone sets hereinafter), a facsimile set or sets, a personal computer set or sets, and the like.

The CCITT recommendations I series prescribes protocol of user-network connection or interface in connection with seven classified layers which are numbered by 1 through 7. For example, layer 1 is directed to physical connecting conditions such as transmission rate, pin number of connectors and others, layer 2 being for data link, layer 3 for call control from a call setup to call release completion.

According to the I series, communication information and control signal are transmitted through different channels which are multiplexed in a time division fashion. The communication information channel is called a B channel and the control information channel is referred to as a D channel. It is possible to transmit communication information through the D channel.

As a basic one of user-network interface structures, a basic interface is determined which comprises two B channels of a transmission rate of 64 kbps which are separately called B1 and B2 channels and a single D channel of a transmission rate of 16 kbps.

Another user-network interface structure is called a primary rate interface which comprises 23 B channels of 64 kbps and a single D channel of 64 kbps.

As will be noted from the above description, the single D channel is commonly used by a plurality of TEs connected in the user bus.

In connection with the layer 2 for data link, a plurality of logical connections or links are made on the D channel by use of LAPD (Link Access Procedure on D channel). Various control information in layer 2 and layer 3 can be transmitted through the links. A frame format of the LAPD is in conformity with the HDLC (High-level Data Link Control Procedure) and comprises a start flag, an address field, a control field, an information field, a frame check sequence and a stop flag. The frame format will later be described in detail with reference to the drawings.

The address field is rewritable to identify each one logical link. The control field is used for type identification of the LAPD frame itself. There are defined a number of types for the LAPD frame. For example, I (Information) frame is used for information transfer in a multiframe mode and UI (Unnumbered Information) frame is used for information transfer in an unacknowledged information transfer mode.

Transfer of call control information in the layer 3 is performed by use of the I frame or the UI frame. The call control information is inserted in the information field in each of the I and UI frames as a layer 3 message. A format of the layer 3 message comprises a common information portion and an individual information portion. The common information portion comprises a protocol discriminator for identifying the layer 3 message, a call reference for referring to a call, and a message type. There are a number of types for the layer 3 message, for example, SETUP for identifying a call request, REL COMP for identifying notice of completion of channel disconnection and release completion of a call reference, and others.

A large number of subscriber lines are extended from an exchange office having an ISDN digital switch to various users. When a user such as a company has a plurality of subscriber lines, it is advantageous to multiplex those subscriber lines into a single transmission line through which signals on the plurality of subscriber lines are transmitted as a TDM (time division multiplexed) signal. That is, B channel signals and D channel signals on a plurality of subscriber lines are time-division multiplexed and are transmitted through the signal transmission line.

Providing that each subscriber line is dependent on the basic interface having two B channels of 64 kbps and a single D channel of 16 kbps and that a primary rate digital transmission line (1544 kbps, 23B+D channels) is used for the single transmission line, only four D channels (64/16=4) can be multiplexed.

In order to resolve the problem, the Bell Communications Research, Inc. proposed a "Statistical Multiplexing" in Bell Communications Research Technical Advisory, TA-TSY-000397, May 2, 1987 (Reference 1). According to the Statistical Multiplexing, 16 D channel signals on subscriber lines of the basic interface are statistically multiplexed into a D channel on the primary rate transmission line. In order to identify each subscriber line and to identify multiplex, the identification information is tagged to the D channel information on each subscriber line to form a new D channel signal which is transmitted to the transmission line in the statistical multiplexing. The new D channel signal will later be described in detail in connection with the drawings.

According to the statistical multiplexing, an increased number of D channels can be multiplexed in comparison with the conventional time division multiplexing. However, a data link is still set up between a TE on one subscriber line and an ISDN switch or exchanger so that it is impossible to reduce load of the ISDN switch.

In multiplexing of a plurality of subscriber lines, it is impossible to handle those lines which belong to different exchange offices.

In another ISDN system, a private line or a privately used line is used. It is also impossible in the multiplexing to handle the private line and subscriber lines which belong to an exchange office together.

SUMMARY OF THE INVENTION

Therefore, it is an object of the present invention to provide an ISDN system having a subscriber line multiplexer wherein load of an ISDN switch can be reduced.

It is another object of the present invention to provide an ISDN system having a subscriber line multiplexer which can process subscriber lines which belong to different exchange offices.

It is still another object of the present invention to provide an ISDN system having a subscriber line multiplexer which enables subscriber lines to connect to a private line.

The present invention is applicable to an ISDN (Integrated Services Digital Network) system comprising a plurality of subscriber lines associated with a plurality of terminal equipments, a subscriber line multiplexer connected to the plurality of subscriber lines, each of the subscriber lines transmitting a basic TDM (Time Division Multiplex) signal between the plurality of terminal equipments and the subscriber line multiplexer at a basic transmission rate, the terminal equipments having different terminal equipment TEIs (Terminal Endpoint Identifiers) assigned thereto as basic TEIs, respectively, the basic TDM signal comprising a plurality of basic information channels for transmitting information and a basic control channel for transmitting a basic control signal, the basic control signal comprising a specific one of the basic TEIs and control information from a specific one of the terminal equipments, a first ISDN digital switch having a TEI list for registering TEIs, and a high rate transmission line coupling the subscriber line multiplexer and the first ISDN digital switch for transmitting a secondary TDM signal therebetween at a primary transmission rate higher than the basic transmission rate, the primary TDM signal comprising a plurality of primary information channels and a primary control channel, the subscriber line multiplexer statistically multiplexing the basic control channel signals on the plurality of subscriber lines into the primary control channel to thereby transmit the control information to the first ISDN digital switch. According to the present invention, the subscriber line multiplexer comprises a plurality of subscriber interface means coupled to the plurality of subscriber lines, respectively and internal bus means coupled to the high rate transmission line and commonly connected to the plurality of subscriber interface means. Each of the subscriber interfaces comprises channel separating means coupled with each one of the subscriber lines for separating the basic control channel signal from the basic TDM signal to produce a separated signal, basic TEI list for memorizing the basic TEIs, basic control means responsive to the separated signal for deriving the control information as a derived control information, the basic control means establishing a basic data link between the specific terminal equipment and the basic control means through the basic control channel in cooperation with the basic TEI list, primary control means having a subscriber TEI assigned to the each one of the subscriber line interface means as a primary TEI which is registered in the TEI list as a primary TEI list of the first ISDN digital switch, the primary control means responsive to the derived control information for making a primary control signal which comprises the primary TEI and the derived control information without the specific basic TEI, and transmitting means for transmitting the primary control signal into the primary control channel through the internal bus in the statistical multiplexing fashion so that a primary data link is established between the primary control means and the first ISDN digital switch through the primary control channel in cooperation with the primary TEI list.

The subscriber line multiplexer may further comprise transmission line interface means coupled to the high rate transmission line for detecting the secondary TDM signal on the high rate transmission line to produce a timing signal, the transmission line interface means being connected to the internal bus means for coupling the internal bus means to the high rate transmission line, and a timing signal line connecting the transmission line interface means to the plurality of subscriber interface means for delivering the timing signal to the plurality of subscriber interface means, the transmitting means detecting the primary control channel based on the timing signal.

According to an aspect of the pesent invention, the ISDN system may further comprise a second ISDN digital switch and cross connecting means for selectively coupling the high rate transmission line to one of the first and second ISDN digital switches. Each of the subscriber interface means further comprises setting means for setting a switch selection code for selecting one of the first and second ISDN digital switches. The switch selection code is contained in the primary control signal together with the primary TEI. The cross connecting means comprises detecting means for detecting the switch selection code in the primary control signal to deliver the secondary control signal to that one of the first and second ISDN digital switches which is identified by the switch selection code.

According to another aspect of the present invention, the ISDN system may further comprise an additional high rate transmission line coupled to the subscriber line multiplexer. Each of the terminal equipments being provided with means for generating line selection signal for selecting one of the high rate transmission line and the additional high rate transmission line. The selection signal is contained in the basic TDM signal to be delivered to the subscriber multiplexer. Each of the subscriber line interface means further comprises additional transmitting means connected to the primary control means for transmitting the primary control signal onto the additional high rate transmission line, and selection signal detector means coupled to the each one of the subscriber lines for detecting the line selection signal to produce an enabling signal and an unabling signal, the enabling signal being delivered to one of the transmitting means and the additional transmitting means to transmit the primary control signal to one of the high rate transmission line and the additional high rate transmission line which is identified by the line selection signal, while the unabling signal being delivered to the other of the transmitting means and the additional transmitting means.

DESCRIPTION OF PREFERRED EMBODIMENTS

Prior to description of embodiments, a known ISDN will be described for the purpose of better understanding of the present invention.

Figure 1:
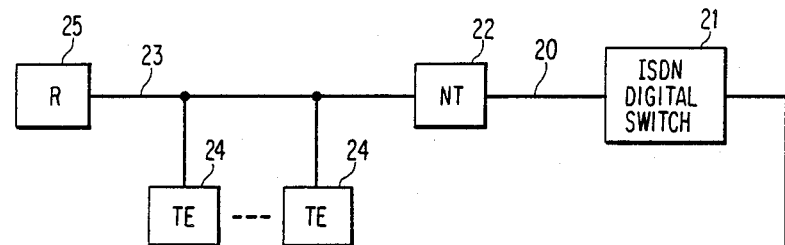
FIG. 1 is a block diagram view of a known ISDN system.
Figure 1:
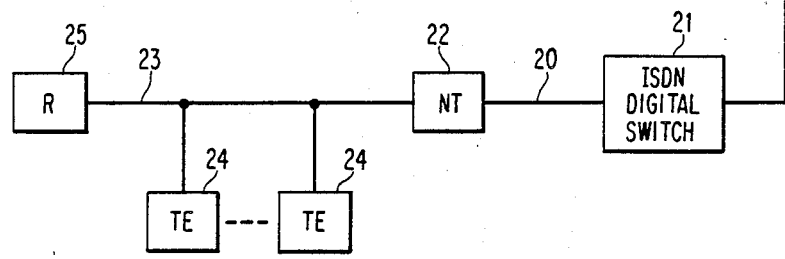

Referring to FIG. 1, a plurality of digital subscriber lines (DSLs) 20 are connected to at least one ISDN digital switch or exchanger 21. In the figure, two ISDN digital switches 21 are shown to be connected through an inter-office line. Each of DSLs 20 is terminated at an individual network termination (NT) unit 22. The NT unit 22 is connected to a subscriber bus 23 to which a plurality of terminal equipments (TEs) 24, for example, digital telephone sets, facsimile sets, personal computers, and the like are connected in a parallel form. Each subscriber bus 23 is terminated to a terminal resistor 25 at an extended end.

In the system, communication can be performed between one or more TEs 24 in one subscriber bus 23 and one or more TEs 24 on another subscriber bus through the ISDN digital switch or switches 21.

The shown ISDN system is arranged dependent on the CCITT recommendations described in the preamble. For example, the basic interface is used between the bus 23 and the NT 22. That is, two B channel signals and a single D channel signal are transmitted on bus 23 and subscriber line 20 between NTs and the ISDN digital switch 21 through NT 22. According to the D channel protocol for layers 2 and 3, the LAPD frame is used for the D channel.

Figure 3:
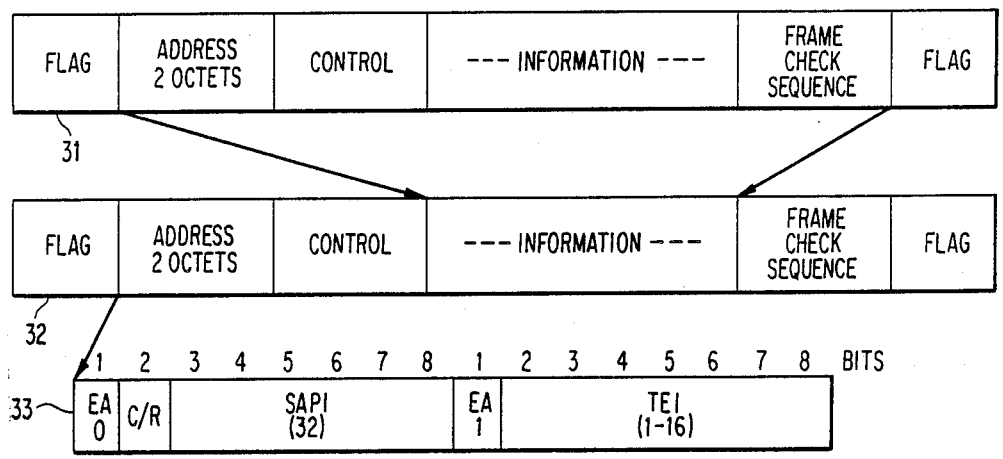
FIG. 3 shows various frame formats of D channel signal used in the system of FIG. 2.

Referring to FIG. 3, an LAPD frame 31 comprises a start flag field (FRAG) of one octet length, an address field (ADDRESS) of two octet length, a control field (CONTROL) of one octet length, an information field (INFORMAION) of a variable length (260 octets at maximum), a frame check sequence (FRAME CHECK SEQUENCE) of one or two octet length, and a stop flag field (FRAG) of one octet length.

Various frame types such as I, UI, and others are determined for the LAPD frame and each type is identified in the control field as described in the preamble.

The address field comprises EA0 of one bit, C/R of one bit, SAPI of 6 bits, EA1 of one bit and TEI of 7 bits similar to a frame portion as shown at 33 in FIG. 3. EA is an address extension bit and EA0 means continuation to the next octet while EA1 means a last octet in the field. C/R is for indication of which the frame is command or response. SAPI is a service access point identifier and TEI is a terminal endpoint identifier. SAPI can take a value from 0 to 63 and several functions are determined for several values, for example, SAPI=0 means that the frame is for call control signal while the remaining values are not yet determined. TEI can take a value from 0 to 127 and TEI values from 64 to 126 are assigned to TEs 24 in each user and registered in a TEI list (not shown) in the ISDN digital switch 21. Values from 0 to 63 are left for free use by users and the remaining value 127 is determined to identify a broadcasting mode.

The TEI value is not fixed to a specific TE but is assigned to each TE when connected to the subscriber line in order to insure portability of TEs.

TEI assignment procedure is also determined in the I series of the CCITT recommendations and is performed between the TE and the ISDN digital switch by use of the UI frame of the LAPD with SAPI=63 and TEI=127 being set in the address field when the TE is connected to the subscliber line connected to the ISDN digital switch. Detail of the assignment procedure is not described herein but will be understood by reference to the I series.

In order to reduce the number of subscriber lines 20 extending from the digital switch 21 to a user such as a company, a plurality of subscriber lines are multiplexed to a high rate transmission line such as a primary rate transmission line, as described in the preamble.

Figure 2:
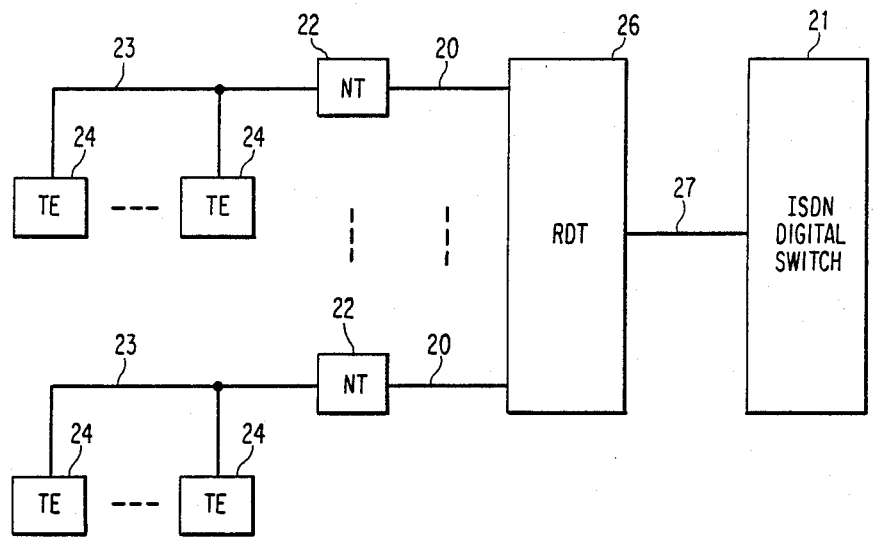
FIG. 2 is a block diagram view of another ISDN system wherein signals on a plurality of subscriber lines are multiplexed in the time division fashion so as to be transmitted to an ISDN digital switch through a single line.

Referring to FIG. 2, a remote digital terminal (RDT) 26 is connected to a primary rate transmission line 27 extending from the ISDN digital switch 21. A plurality of subscriber lines 20 are connected to RDT 26, and each subscriber line is provided with NT 22, a user bus 23, and a plurality of TEs 24 connected to the user bus 23. B channel signals and D channel signals on the subscriber lines 20 are multiplexed in the time division fashion and are transmitted through the primary rate transmission line 27 to the ISDN digital switch.

Bell proposed the "Statistical Multiplexing" in Reference 1 as described in the preamble to enable to multiplex an increased number of D channel signals.

In order to insure the statistical multiplexing, Bell uses a new LAPD frame format.

Referring to FIG. 3, the new LAPD frame format 32 is characterized by insertion of the LAPD frame 31 on the subscriber channel into an information field of the new LAPD frame 32, although the start and stop flags (FLAG) in frame 31 are removed. Accordingly, the new LAPD frame format is appreciated as a multiple LAPD frame format. Further, in the new LAPD frame, SAPI in the address field is fixed to be a value 32 which is determined to identify the new frame after multiplication, as shown at 33 in FIG. 3. One of values from 1 to 16 is assigned to TEI in the same address field as DSL numbers, as shown below the address field format 33 in FIG. 3.

UI is inserted in a control field (CONTROL) of the new LAPD format so that the new frame is the UI frame.

According to the statistical multiplexing manner using the new or multiple LAPD frame, the ISDN digital switch 21 must process two control information sets for two TEIs in one D channel signal. This means that load of the ISDN digital switch is not decreased but increased.

The present invention aims to reduce load of the ISDN digital switch in use of the statistical multiplexing of D channel signals on a plurality of subscriber lines. A fundamental concept of the present invention will be described below.

Figure 4:
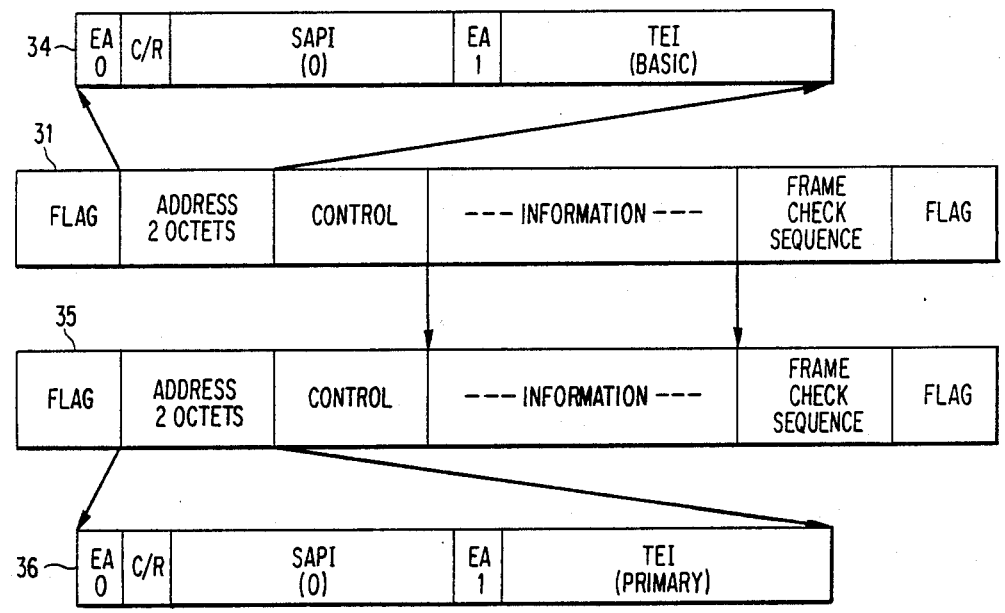
FIG. 4 shows frame formats of the D channel signal used in the present invention.

Referring to FIG. 4, the LAPD frame 31 of the D channel signal on the subscriber line is shown together with the address field (ADDRESS) 34 and has been described in connection with FIG. 3. Another LAPD frame 35 is also shown together with its address field 36 and has a format similar to the LAPD frame 31.

According to the present invention, the LAPD frame 31 on the basic interface is converted into the other LAPD frame 35 which is then transmitted onto a high rate or primary rate transmission line in the statistical multiplexing fashion. Accordingly, the LAPD frame 31 will be called a basic LAPD frame and its various fields will be referred to as individual field names with a term of "basic" being prefixed to the names. On the other hand, the other LAPD frame 35 will be called a primary LAPD frame and its individual field names will be called individual field names with a term "primary" being prefixed to the names.

In the basic address field 34 in the basic LAPD frame, SAPI is set to be 0 for the call control and TEI is set as a value (64-126) assigned to a TE which originates the D channel signal. TEI inserted in the basic address field 34 will be called a basic TEI and is not registered in the TEI list in the ISDN digital switch but is registered in a basic TEI list provided in a subscriber line multiplexer which will later be described in connection with FIG. 5.

In the subscriber line multiplexer, the primary LAPD frame 35 is formed. The basic information field in the frame 31 is copied into a primary information field (INFORMATION) in the primary frame 35. A primary control field in the primary LAPD frame 35 can take a control field information such as UI or I necessary between the subscriber line multiplexer and the ISDN digital switch. Therefore, in some cases, the primary control field is same as the basic control field, but in other cases the primary control field is different from the basic control field. TEI in the primary address field 36 is not similar to the basic TEI but is a value assigned to the subscriber and registered to the TEI list in the ISDN digital switch. The TEI in the primary frame 35 will be referred to as a primary TEI.

In layer 3 for call control, the basic TEI is written into layer 3 message as a part of the call reference in order to enable to distinguish the TE originating the call request.

The call reference area in the layer 3 message has an increased portion of one octet in the primary rate interface in comparison with the basic interface. The basic TEI is written into the increased portion in the primary LAPD frame.

A plurality of primary LAPD frame signals formed for the subscriber lines are transmitted to the ISDN digital switch through a primary rate transmission line after statistically multiplexed.

According to the procedure of the present invention, the basic information from a TE can be transferred to the ISDN digital switch reliably but the ISDN digital switch need not process two control information sets for two TEIs. That is, the subscriber lines are seen from the ISDN digital switch as if they are terminal equipments in the conventional system. The subscriber line multiplexer distinguishes TEs on a subscriber line by the TEIs. Accordingly, the ISDN digital switch is freed from an excessive load.

Figure 5:
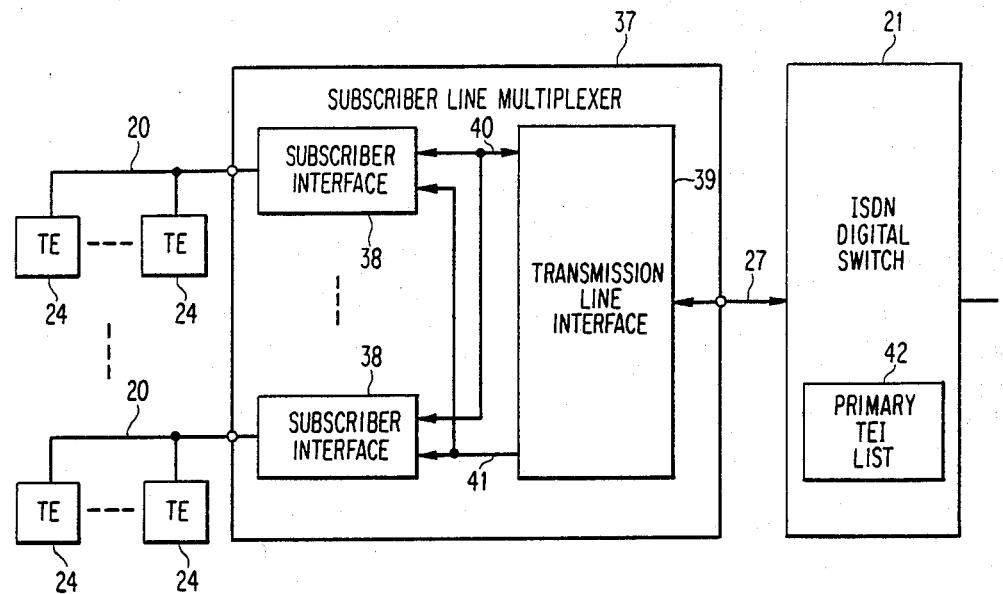
FIG. 5 is a block diagram view of an ISDN system using a subscriber line multiplexer according to an embodiment of the present invention.

Referring to FIG. 5, the shown ISDN system is similar to that in FIG. 2 and the similar portions are represented by the same reference numerals.

In the system of the embodiment, a subscriber line multiplexer 37 is corresponding to the RDT 26 in FIG. 2 but is different from the RDT 26. The subscriber line multiplxer 37 is for performing the conversion from the basic LAPD frame to the primary LAPD frame and also performing the time division multiplexing of the primary LAPD frame signals in the statistical multiplexing fashion. The subscriber line multiplexer 37 comprises a plurality of subscriber interfaces 38 connected to a plurality of subscriber lines 20, a transmission line interface 39 connected to the primary rate transmission line 27, an internal bus 40 connecting the plurality of subscriber interfaces 38 to the transmission line interface 39 commonly, and a timing signal line 41 for supplying a timing signal from the transmission line interface 39 to subscriber interfaces 38. The subscriber interface 38 actually performs the conversion from the basic LAPD frame to the primary LAPD frame and transmits the primary LAPD frame signal to the internal bus 40 for performing the statistical multiplexing with like primary LAPD frame signals from the other subscriber interfaces 38 to produce the multiplexed signal. The transmission line interface 39 is for detecting a frame on the TDM signal on the primary rate transmission line 27 to produce the timing signal and for transmitting the multiplexed signal on the internal bus 40 to the Primary rate transmission line 27 after adding a frame bit or a synchronization bit.

In the shown embodiment, NTs are not used and TEs 24 are directly connected to the subscriber lines 20. That is, the subscriber interfaces 38 function as the network terminations. The ISDN digital switch 21 is shown to have the TEI list as a primary TEI list 42 which is for registering the primary TEI as described in connection with FIG. 4.

Now, the TDM signal on each of the subscriber lines 20 is called a basic TDM signal and the B channel and the D channel in the basic TDM signal are called a basic B channel and a basic D channel, respectively. On the other hand, the TDM signal on the Primary rate transmission line 27 is called a primary TDM signal and the B channel and the D channel in the primary TDM signal are called a primary B channel and a primary D channel, respectively.

Figure 6:
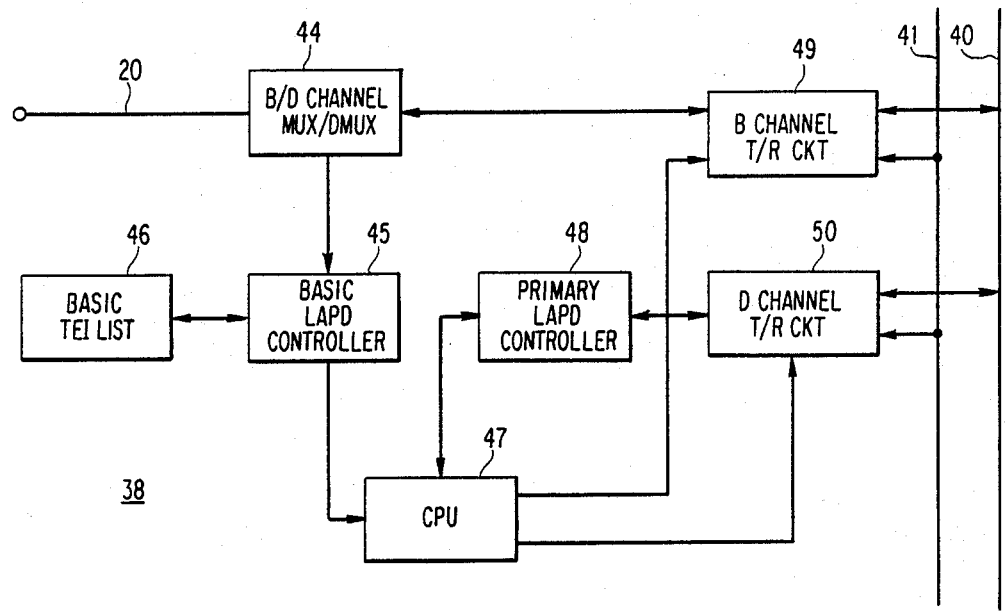
FIG. 6 is a block diagram view of a subscriber interface used in FIG. 5.

Referring to FIG. 6, each of the subscriber interface 38 comprises a B/D channel multiplexer-demultiplexer (MUX/DMUX) 44, a basic LAPD controller 45, a basic TEI list 46, a central processing unit (CPU) 47, a primary LAPD controller 48, a B channel transmitter/receiver (T/R) circuit 49, and D channel transmitter/receiver (T/R) circuit 50.

A basic TDM signal (2B+D for the basic interface) is supplied to the B/D channel multiplexer/demultiplexer 44 from the subscriber line 20. The B/D channel multiplexer/demultiplexer 44 is for separating the basic D channel signal or the basic control signal from the basic TDM signal as a separated signal having the basic LAPD frame 31 in FIG. 4. The B/D channel multiplexer/demultiplexer 44 serves as a channel separator. The separated signal is applied to the basic LAPD controller 45 while the basic B channel signal is subjected to the rate adaptation and then supplied to the B channel transmitter/receiver circuit 49 as the primary B channel signal.

The basic LAPD controller 45 refers to the basic TEI list 46 and removes the basic start and stop flag portions, the basic address field, the basic control field, and the basic frame check sequence from the derived signal (31 in FIG. 4) under control of the central processing unit 47 when the TEI in the basic address field (34 in FIG. 4) is registered in the basic TEI list 46. The remaining basic information field in the basic LAPD frame (31) of the derived signal is supplied to the central processing unit 47 and applied to the primary LAPD controller 48 therefrom. The primary LAPD controller 48 holds the primary TEI which is assigned to the subscriber interface 38 itself and registered in the primary TEI list 42 in the ISDN digital switch 21. The primary LAPD controller 48 receives the basic information field and forms the primary LAPD frame (35 in FIG. 4) signal or the primary control signal. Therefore, the basic LAPD controller 45, the basic TEI list 46, the central processing unit 47, and the primary LAPD controller 48 function to convert the basic control signal into the primary control signal.

Assignment of the basic TEI and registration of the basic TEI in the basic TEI list 46 can be performed between each one of TEs 24 and the corresponding subscriber interface 38 according to a procedure similar to the TEI assignment procedure determined by the I series. The primary TEI is assigned and registered in primary TEI list 42 according to the similar assignment procedure performed between each one of the subscriber interfaces 38 and the ISDN switch 21.

The primary control signal is applied to the D channel transmitter/receiver circuit 50 and is transmitted into an unused time slot in the primary D channel on the internal bus 40 at a timing according to the timing signal applied thereto through the timing signal line 41. Thus, a plurality of primary control signals made in the plurality of subscriber interface 38 are statistically multiplexed in the primary D channel.

While, the primary B channel signal is transmitted in a primary B channel on the internal bus 40 from the B channel transmitter/receiver circuit 49 in the time division fashion so that basic B channel signals in the plurality of the subscriber interfaces 38 are multiplexed. Thus, the primary TDM signal carries the primary B channel signals and the primary control signals to the ISDN digital switch 21 through the primary rate transmission line 27.

In receiving the primary TDM signal originated by the ISDN digital switch 21, the D channel transmitter/receiver circuit 50 receives the primary D channel signal which is supplied to the primary LAPD controller 48. When the primary LAPD controller 48 detects the own primary TEI assigned to the subscriber interface 38 itself in one of the primary control signals in the primary D channels, the primary LAPD controller 48 derives the primary information field in the primary control signal (35 in FIG. 4). The derived primary information field is supplied to the basic LAPD controller 45 through the central processing unit 47. The basic LAPD controller 45 cooperates with the central processing unit 47 and the basic TEI list 46 and forms the basic control signal of the basic LAPD frame (31 in FIG. 4) in which the derived primary information field is written into the basic information field and the basic address field, respectively. Thus, the basic LAPD controller 45, the basic TEI list 46, the central processing unit 47, and the primary LAPD 48 function to convert the primary control signal to the basic control signal. The converted basic control signal is supplied to the B/D channel multiplexer/demultiplexer 44.

The B channel transmitter/receiver circuit 49 receives the primary B channel signal in a specific one of primary B channels on the primary TDM signal indicated by the central processing unit 47. The primary B channel signal is subjected to the rate adaptation and is also supplied to the B/D channel multiplexer/demultiplexer 44 as a basic B channel signal. The B/D channel multiplexer/demultiplexer 44 multiplexes the basic control signal supplied from the basic LAPD controller 45 and the basic B channel signal supplied from the B channel transmitter/receiver circuit 49 to form the basic TDM signal which is transmitted to the subscriber line connected to the subscriber interface 38. One of TEs 24 on the subscriber line 20 receives the basic control signal according to the basic TEI in the signal.

In the embodiment, a basic data link is established by the basic LAPD signal between one of TE 24 on the subscriber line 20 and the subscriber interface 38 connected thereto. While, a primary data link is also established by the primary LAPD signal between the subscriber interface 38 and the ISDN digital switch 21. Accordingly, the ISDN digital switch 21 only processes the primary control signal so that the ISDN switch 21 has a reduced load. The subscriber interface 38 serves as a switch for TEs 24 on the corresponding subscriber line 20 for the D channel signal.

Figure 7:
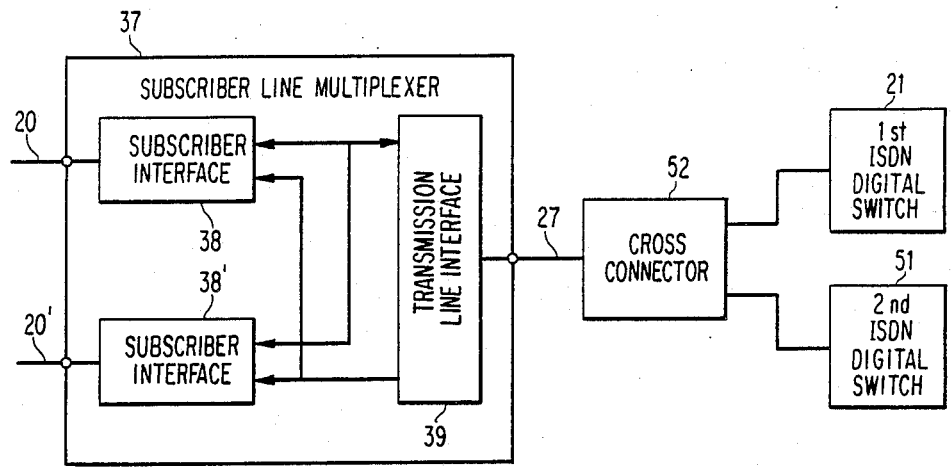
FIG. 7 is a block diagram view of an ISDN system according to a second embodiment of the present invention wherein a plurality of subscriber lines are cross-connected to different ISDN digital switch.

Referring to FIG. 7, ISDN system shown therein comprises a first and a second ISDN digital switches 21 and 51, a subscriber line multiplexer 37 similar to that in FIGS. 5 and 6, and a cross connector 52 for cross connecting the Primary rate transmission line 27 to the first and the second ISDN digital switch. One of the subscriber lines 20 and 20' belongs to not the first ISDN digital switch 21 but the second ISDN digital switch 51. Therefore, the one subscriber line is depicted by 20' and the corresponding subscriber interface is represented by 38'. The remaining subscriber lines 20 belong to the first digital switch 21.

Figure 8:
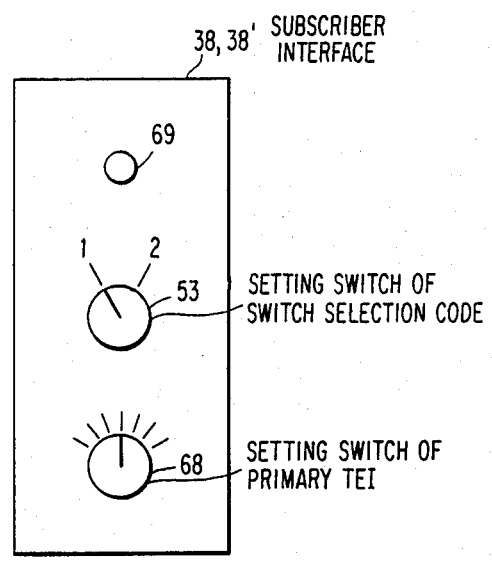
FIG. 8 is a front view of a subscriber interface used in the subscriber line multiplexer according to the second embodiment.

Referring to FIG. 8, each of the subscriber interfaces 38 and 38' is provided with a setting switch 53 (setting means) for manually setting a switch selection code identifying one of the first and second ISDN digital switches 21 and 51. In the present embodiment, the first and second ISDN digital switches 21 and 51 are numbered to be 1 and 2, respectively. When the setting switch 53 is set to No. 1, the switch selection code is 1 and is held in the primary LAPD controller (48 in FIG. 6) in the corresponding subscriber interface 38. On the other hand, the setting switch 53 is set to be 2 in the subscriber interface 38' and the switch selection code of 2 is held in the primary LAPD controller 48 in the subscriber interface 38'. The switch selection code is written into the primary address field in the primary LAPD frame signal together with the primary TEI when the primary LAPD controller 48 forms the primary LAPD frame signal 35 in FIG. 4.

The cross connector 52 comprises a detecting means for detecting the switch selection code in the primary control signal in the primary D channel on the transmission line 27. When the detecting means detects the switch selection code the cross connector 52 delivers the primary control signal to one of the first and second ISDN digital switches 21 and 51 which is identified by the detected switch selection code.

Figure 9:
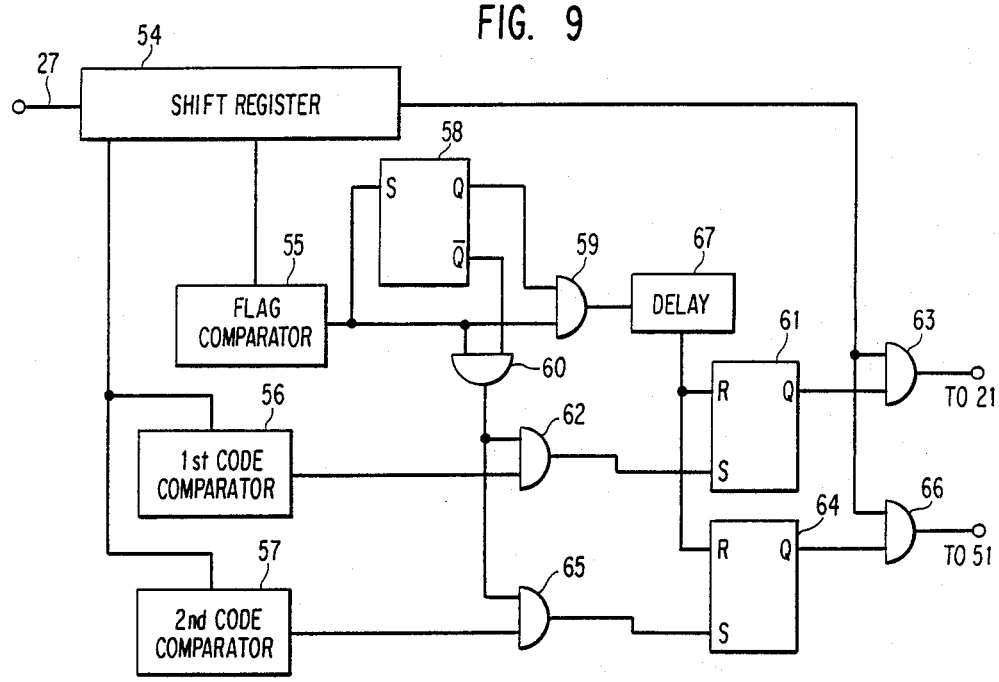
FIG. 9 is a circuit diagram view of a cross connector in FIG. 7.

Referring to FIG. 9, the cross connector 52 comprises a shift register 54 for receiving the primary TDM signal on the transmission line 27 which signal is shifted therein one by one bit. The shift register 54 is connected to a flag comparator 55 at a predetermined stage and is commonly connected to a first and a second code comparator 56 and 57 at a different stage of the register 54 so that the switch selection code is checked by the first and second code comparators 56 and 57 when the start flag is checked by the flag comparator 55.

When the flag is detected by the flag comparator 55, a detected signal is delivered to a flipflop 58, and AND gates 59 and 60. Then, the flipflop 58 is set and the AND gate 60 is opened while the AND gate 59 is closed.

The first code comparator 56 has a reference value 1 and compares the switch selection code in the primary TEI field with the reference value 1. When the switch selection code is 1, the first code comparator 56 produces a first code detecting signal which is then supplied to a flipflop 61 through an AND gate 62. Then, the flipflop 61 is set and another AND gate 63 is open. Thus, the primary control signal in the shift register 54 is delivered to the first ISDN digital switch 21 through the AND gate 63.

When the switch selection code is 2, the second code comparator 57 produces a second code detecting signal which sets a flipflop 64 through an AND gate 65. Accordingly, an AND gate 66 is open and the primary control signal is delivered from the shift register 54 to the second ISDN digital switch 51 through the AND gate 66.

The first and second code comparators 56 and 57 serve as the detecting means for detecting the switch selection code in the cross connector 52 as described above.

Thereafter, when the flag is detected by the flag comparator 55, the comparator 55 again produces the detected signal which resets the flipflop 58. Then, the AND gate 59 is open and the AND gate 60 is closed. The detected signal is applied to a delay circuit 67 through the AND gate 59 and resets that one of the flipflops 61 and 64 which is in the set condition after being delayed by 8 bits at the delay circuit 67. Then, the corresponding one of the AND gates 63 and 66 is closed so that the primary control signal is stopped after completion of delivering the primary control signal from the shift register 54.

In the manner as described above, the primary control signal is cross connected to one of the first and the second ISDN digital switches 21 and 51.

Returning to FIG. 8, each of the subscriber interfaces 38 and 38' can be provided with a manual TEI setting switch 68. As a result, the primary TEI is manually set by the manual setting switch 68. When the primary TEI is set by the switch 68, the primary TEI assignment and registration procedure is performed according to the I series of the CCITT as described above between the subscriber interface 38 or 38' and the first or the second ISDN digital switch 21 or 51. When the TEI assigned by the first or the second digital switch 21 or 51 is different from the manually set primary TEI, a lamp 69 on the subscriber interface 38 or 38' is illuminated. Then, the manual setting switch 68 is again operated to set a fresh primary TEI. After repetition of the operation, the lamp 69 is extinguished when the manually set primary TEI is consistent with a primary TEI assigned by the first or the second ISDN digital switch 21 or 51.

Figure 10:
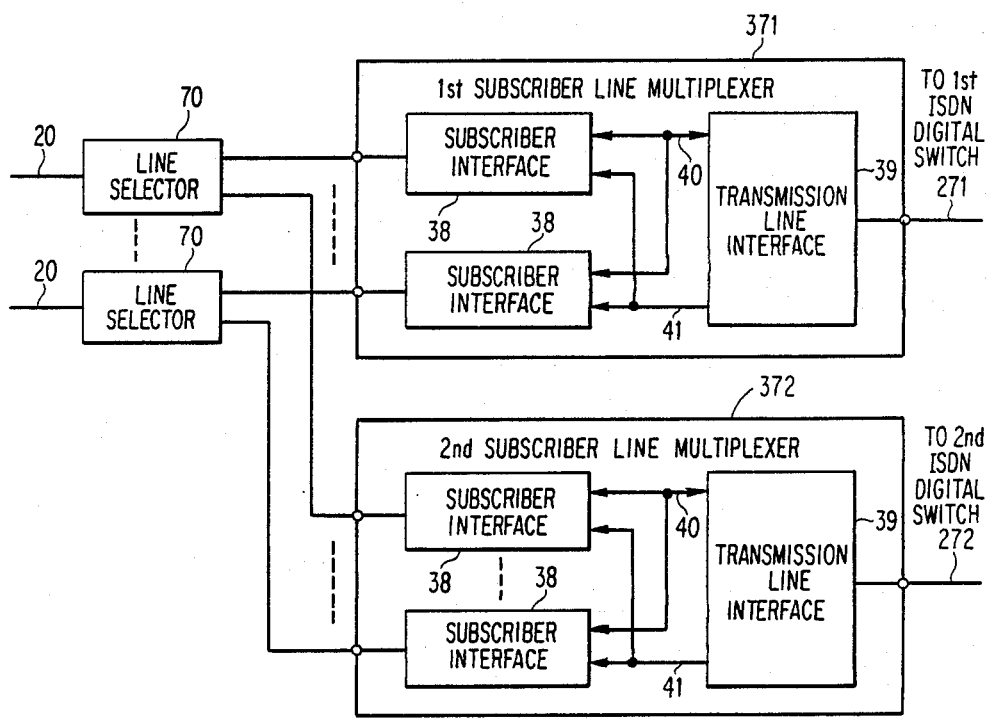
FIG. 10 is a block diagram view of a main portion of a third embodiment.

Referring to FIG. 10, an ISDN system according to another embodiment comprises a first higher primary rate transmission line 271 connected to a first ISDN digital switch and a second high or primary rate transmission line 272 connected to a second ISDN switch.

The first and second high or primary rate transmission lines 271 and 272 are connected to a first and a second subscriber line multiplexer 371 and 372, respectively. Each of the first and second subscriber line multiplexers 371 and 372 are similar to each other and comprises an arrangement similar to the subscriber line multiplexer 37 as shown in FIGS. 5 and 6. Therefore, the first and second multiplexers 371 and 372 are shown to have blocks represented by the same reference numerals as in FIG. 5 and description thereto is omitted for the purpose of simplification of the description.

Each of the subscribers lines 20 is coupled to the first and the second subscriber line multiplexers 371 and 372 through a line selector 70. The line selector 70 is for selectively connecting the corresponding subscriber line 20 to the first and the second subscriber line multiplexers 371 and 372.

Figure 11:
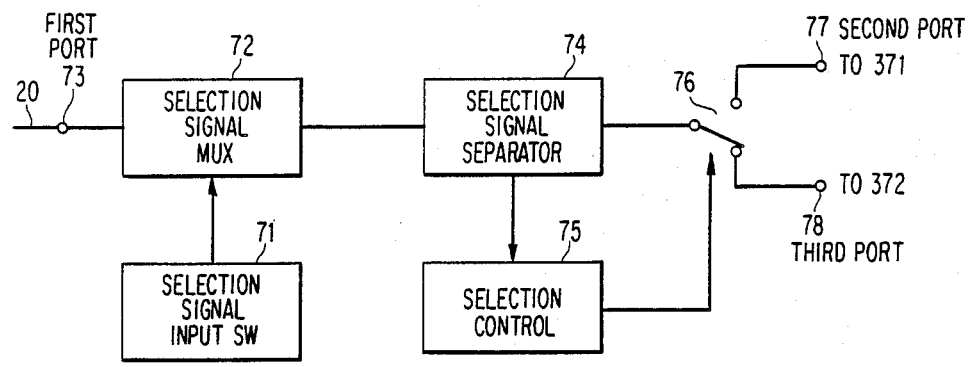
FIG. 11 is a block diagram view of a line selector in FIG. 10.

Referring to FIG. 11, the line selector 70 comprises a selection signal input switch 71.

Figure 12:
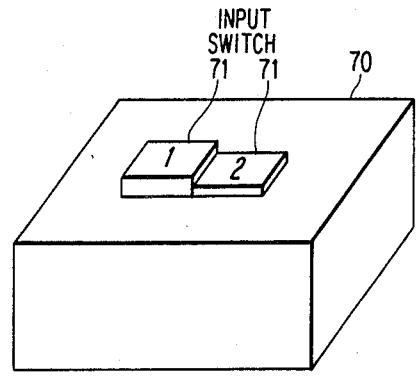
FIG. 12 is a perspective view of the line selector of FIG. 11.

Referring to FIG. 12, the selection signal input switch 71 comprises two key switches which are numbered 1 and 2. When No. 1 key switch is pushed down, a selection signal is set a binary "1" for selecting the first transmission line 271. On the other hand, when No. 2 key switch is pushed down, a selection signal is set a binary of "0" for selecting the second transmission line 272.

The subscriber line 20 is connected to a selection signal multiplexer 72 through a first port 73 so as to multiplex the basic TDM signal on the subscriber line 20 and the selection signal from the selection signal input switch 71.

According to the I series of the CCITT, a frame of an electric signal on the basic interface comprises 48 bits and includes an unused bits called "S" bits in addition to the B channel bits, the D channel bits, and other used bits.

The selection signal is inserted into the "S" bits by the selection signal multiplexer 72 to produce a multiplexed signal.

The multiplexed signal is applied to a selection signal separator 74. The selection signal is separated from the multiplexed signal at the selection signal separator 74 and is supplied to a selection control circuit 75. The remaining signal that is the basic TDM signal is applied to a switch 76 which is controlled by the selection control circuit 75.

The switch 76 has a second and a third port 77 and 78 so that the basic TDM signal from the selection signal separator 74 is selectively connected to the second and the third ports 77 and 78 by switching operation of the switch 76. The second port 77 and the third port 78 are connected to the first and the second subscriber line multiplexers 371 and 372.

When the No. 1 key switch is pushed down, the switch 76 is connected to the second port 77 and the basic TDM signal is applied to the corresponding subscriber interface 38 in the first subscriber line multiplexer 371. Then, the basic TDM signal is converted into the primary TDM signal by the first subscriber line multiplexer 371 in the similar fashion in the embodiment of FIGS. 5 and 6 and is transmitted to the first ISDN digital switch through the transmission line 271.

On the contrary, when No. 2 key switch is pushed down, the basic TDM signal is applied to the corresponding subscriber interface 38 in the second subscriber line multiplexer 372 through the third port 78. Accordingly, the basic TDM signal will be converted to the primary TDM signal and is transmitted to the second ISDN digital switch through the second transmission line 272.

In the actual use, when one or more of the subscriber lines 20 belong to the first ISDN digital switch, those line selectors 70 connected thereto are adjusted to the selection signal of a binary bit "1" by pushing the No. 1 key. The remaining line selectors are set to generate the selection signal of binary bit "0" by pushing down No. 2 key switch.

When all of the subscriber lines 20 belong to the first ISDN digital switch and when the second transmission line 272 is a private line connected to an external subscriber unit, all of the line selectors 70 may usually be adjusted to the selection signal of a binary bit "1" so that the basic TDM signals on all of the subscriber lines 20 are supplied to the first subscriber line multiplexer 371. When it is desired to connect a specific one of the subscriber lines 20 with the private line 272, a specific line selector 70 connected to the specific subscriber line is set to produce the selection signal of a binary bit of "0" by pushing down No. 2 key switch. Then, the specific subscriber line is coupled with the private line 272 through the second subscriber line multiplexer 372.

Figure 13:
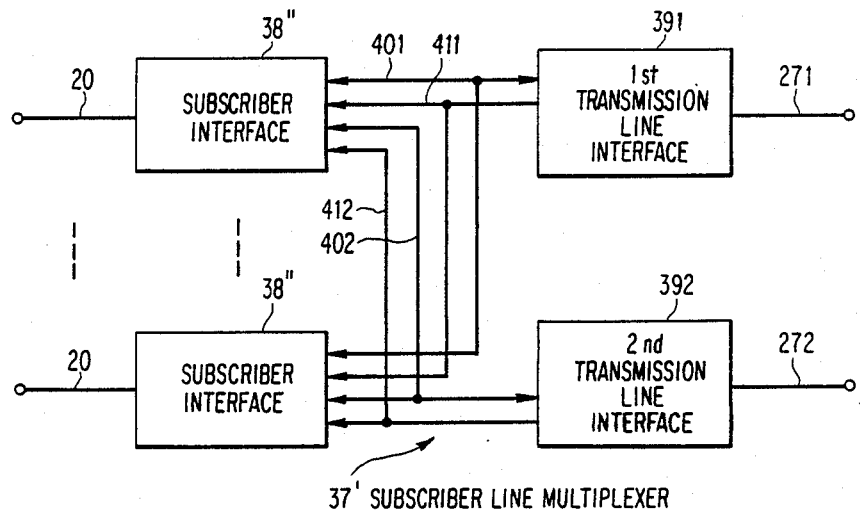
FIG. 13 is a block diagram view of a portion of a fourth embodiment.

Referring to FIG. 13, an ISDN system according to another embodiment has a first and a second high or primary transmission line 271 and 272 similar to the embodiment of FIG. 10. The first high or primary transmission line 271 is connected to a first ISDN digital switch, while the second high or primary transmission line 272 is connected to a second ISDN digital switch or is a private line for connecting to a specific external subscriber.

A single subscriber line multiplexer 37' comprises a first and a second transmission line interface 391 and 392 which are arranged similar to each other and similar to the transmission line interface 39 in FIG. 6.

The subscriber line multiplexer 37' further comprises a plurality of subscriber interfaces 38" which are connected to the first transmission line interface 391 through a first internal bus 401 and a first timing signal line 411. The subscriber interfaces 38" are also connected to the second transmission line interface 392 through a second internal bus 402 and a second timing signal line 412.

The basic TDM signal on each of the subscriber lines 20 has a selection signal in each of the "8" bits as described in connection with FIG. 11. The selection signal is also input to the basic TDM signal by provision of a selection signal input switch and a selection signal multiplexer in TEs on the subscriber line 20 similar to those shown at 71 and 72 in FIGS. 11 and 12.

The basic TDM signal is applied from the subscriber line 20 to the corresponding one of subscriber interfaces 38". Each of the subscriber interfaces 38" detects the selection signal in the basic TDM signal and transmits the primary TDM signal in the time division fashion to that one of the first and the second high rate transmission lines 271 and 272 which is indicated by the selection signal.

Figure 14:
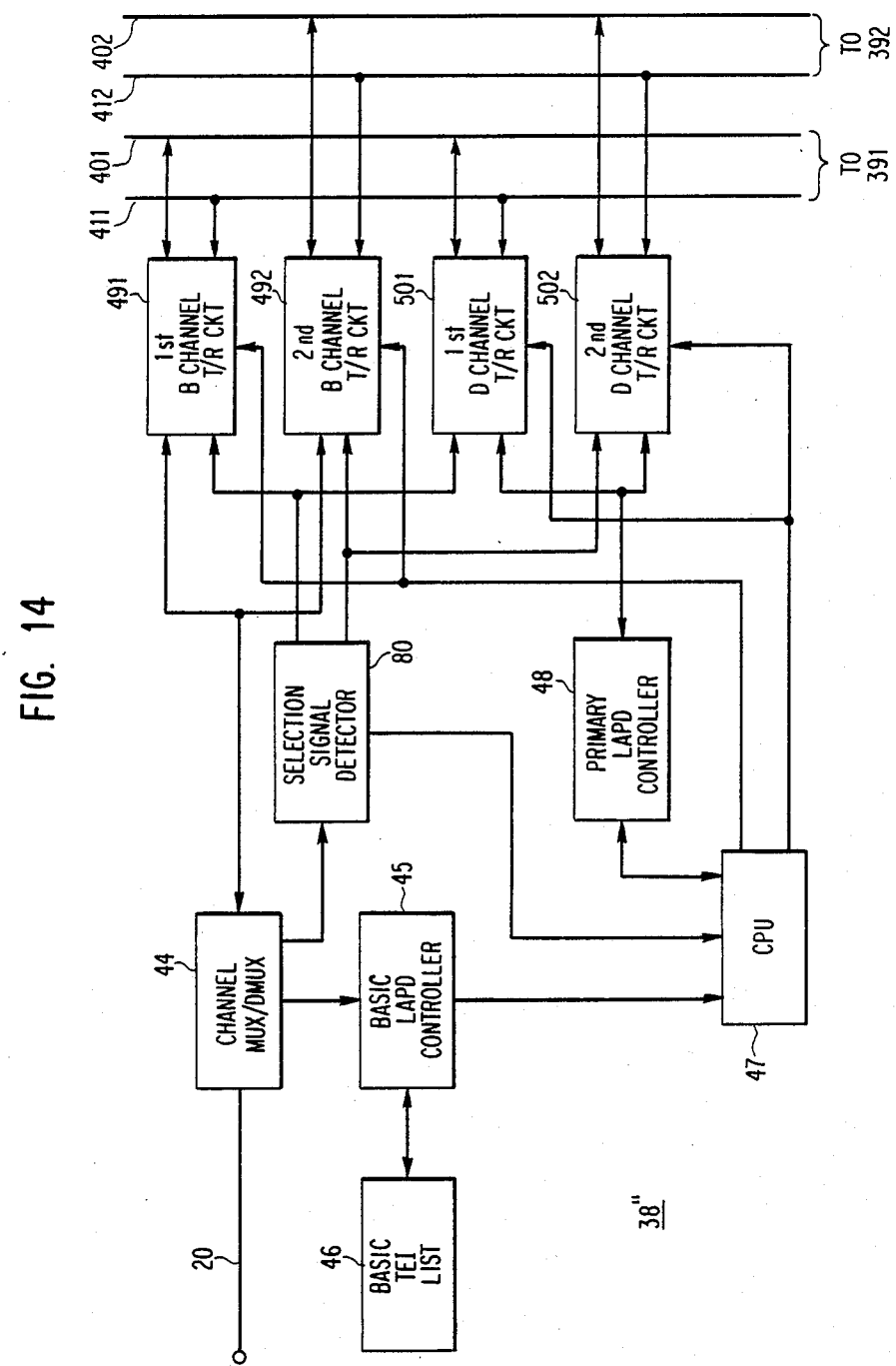
FIG. 14 is a block diagram view of a subscriber interface in FIG. 13.

Referring to FIG. 14, the subscriber interface 38" is similar to the subscriber interface 38 in FIG. 6 but further comprises a selection signal detector 80 connected to the channel multiplexer/demultiplexer 44. The channel multiplexer/demultiplexer 44 functions similar to the B/D channel multiplexer/demultiplexer 44 in FIG. 5 and also functions to separate the "S" bit signal from the basic TDM signal. The "S" bit signal represents the selection signal as described above. The "S" bit signal is applied to the selection signal detector 80 which decides "1" or "2" of the selection signal to produce an enabling signal and an unable signal when the selection signal is decided.

The subscriber interface 38" further comprises a first and a second B channel transmitter/receiver circuit 491 and 492 which is similar to each other and similar to the B channel transmitter/receiver circuit 49 in FIG. 6. Those first and second B channel transmitter/receiver circuits 491 and 492 are connected to the channel multiplexer/demultiplexer 44 commonly. Those first and second B channel transmitter/receiver circuits 491 and 492 are also connected to the first and second transmission line interfaces 391 or 392 through the first internal bus 401 and the first timing signal line 411 and through the second internal bus 402 and the second timing signal line 412, respectively.

The subscriber interface 38" further comprises a first and a second D channel transmitter/receiver circuit 501 and 502 which is similar to each other and similar to the D channel transmitter/receiver circuit 50 in FIG. 6. Those first and second D channel transmitter/receiver circuits 501 and 502 are connected to the primary LAPD controller 48 commonly. Those first and second D channel transmitter/receiver circuits 501 and 502 are also connected to the first and second transmission line interfaces 391 or 392 through the first internal bus 401 and the first timing signal line 411 and through the second internal bus 402 and the second timing signal line 412, respectively.

When the selection signal detector 80 decides "1", the selection signal detector 80 delivers the enabling signal to the first B channel transmitter/receiver circuit 491 and the first D channel transmitter/receiver circuit 501 and delivers the unable signal to the second B channel transmitter/receiver circuit 492 and the second D channel transmitter/receiver circuit 502. Accordingly, the subscriber interface 80 transmits and receives the primary TDM signal to and from the first high or primary transmission line 271 through the first B channel transmitter/receiver circuit 491, the first D channel transmitter/receiver circuit 501, the first transmission line interface 391, in the similar manner of the embodiment in FIGS. 5 and 6.

When the selection signal detector 80 decides "0", the selection signal detector 80 delivers the enabling signal to the second B channel transmitter/receiver circuit 492 and the second D channel transmitter/receiver circuit 502 and delivers the unable signal to the first B channel transmitter/receiver circuit 491 and the first D channel transmitter/receiver circuit 501. Accordingly, the subscriber interface 38" transmits and receives the primary TDM signal to and from the second high or primary transmission line 272 through the second B channel transmitter/receiver circuit 492, the second D channel transmitter/receiver circuit 502, the second transmission line interface 392, in the similar manner of the embodiment in FIGS. 5 and 6.

Thus, when the selection signal input switch is pushed down in a specific one of TEs to select one of the first high or primary transmission lines 271 and 272, the specific TE is connected to the selected one of the first and second transmission lines 271 and 272.

What is claimed is:

1. In an ISDN (Integrated Services Digital Network) system comprising a plurality of subscriber lines associated with a plurality of terminal equipments, a subscriber line multiplexer connected to said plurality of subscriber lines, each of said subscriber lines transmitting a basic TDM (Time Division Multiplex) signal between said plurality of terminal equipments and said subscriber line multiplexer at a basic transmission rate, said terminal equipments having different terminal equipment TEIs (Terminal Endpoint Identifiers) assigned thereto as basic TEIs, respectively, said basic TDM signal comprising a plurality of basic information channels for transmitting information and a basic control channel for transmitting a basic control signal, the basic control signal comprising a specific one of said basic TEIs and control information from a specific one of said terminal equipments, a first ISDN digital switch having a list of TEIs for registering TEIs, and a first high rate transmission line coupling said subscriber line multiplexer and said first ISDN digital switch for transmitting a primary TDM signal therebetween at a primary transmission rate higher than said basic transmission rate, said primary TDM signal comprising a plurality of primary information channels and a primary control channel, said subscriber line multiplexer statistically multiplexing the basic control channel signals on said plurality of subscriber lines into said primary control channel to thereby transmit said control information to said first ISDN digital switch, the improvement wherein said subscriber line multiplexer comprises:

a plurality of subscriber interface means coupled to said plurality of subscriber lines, respectively; and
internal bus means coupled to said first high rate transmission line and commonly connected to said plurality of subscriber interface means;
each of said subscriber interface means comprising:
channel separating means coupled with each one of said subscriber lines for separating said basic control channel signal from said basic TDM signal to produce a separated signal;
a basic TEI list for memorizing said basic TEIs;
basic control means responsive to said separated signal for deriving said control information as a derived control information, said basic control means establishing a basic data link between said specific terminal equipment and said basic control means through said basic control channel in cooperation with said basic TEI list;
primary control means having a subscriber TEI assigned to said each one of said subscriber interface means as a primary TEI, said primary TEI being registered in said list of TEIs in said first ISDN digital switch as a primary TEI, said primary control means responsive to said derived control information for making a primary control signal which comprises said primary TEI and said derived control information without said specific basic TEI; and
transmitting means for transmitting said primary control signal into said primary control channel through said internal bus in the statistical multiplexing fashion so that a primary data link is established between said primary control means and said first ISDN digital switch through said primary control channel in cooperation with said primary TEI list.

2. An ISDN system as claimed in claim 1, wherein said subscriber line multiplexer further comprises:
transmission line interface means coupled to said high rate transmission line for detecting said primary TDM signal on said first high rate transmission line to produce a timing signal, said transmission line interface means being connected to said internal bus means for coupling said internal bus means to said first high rate transmission line; and
a timing signal line connecting said transmission line interface means to said plurality of subscriber interface means for delivering said timing signal to said plurality of subscriber interface means;
said transmitting means detecting said primary control channel based on said timing signal.

3. An ISDN system as claimed in claim 2, which further comprises:
a second ISDN digital switch and cross connecting means for selectively coupling said first high rate transmission line to one of said first and second ISDN digital switches;
each of said subscriber interface means further comprising setting means for setting a switch selection code for selecting one of said first and second ISDN digital switches, said switch selection code being contained in said primary control signal together with said primary TEI;
said cross connecting means comprising detecting means for detecting said switch selection code in said primary control signal to deliver said primary control signal to that one of said first and second ISDN digital switches which is identified by said switch selection code.

4. An ISDN system as claimed in claim 3, wherein each of said subscriber interface means further comprises means for manually setting said primary TEI.

5. An ISDN system as claimed in claim 1, which further comprises:
a second high rate transmission line coupled to said subscriber line multiplexer;
each of said subscriber lines being provided with selection signal input means for inputting a selection signal for selecting one of said high rate transmission line and said additional high rate transmission line into said basic TDM signal on each of said subscriber lines;
each of said subscriber line interface means further comprising:
another transmitting means connected to said primary control means for transmitting said primary control signal onto said second high rate transmission line; and
selection signal detector means coupled to said each one of said subscriber lines for detecting said selection signal to produce an enabling signal and an unable signal, said enabling signal being delivered to one of said transmitting means and said another transmitting means to transmit said primary control signal to one of said first high rate transmission line and said second high rate transmission line which is identified by said seletion signal, while said unable signal being delivered to the other of said transmitting means and said another transmitting means.

6. An ISDN system as claimed in claim 1 wherein said subscriber line multiplexer is a first subscriber line multiplexer, and wherein said ISDN system further comprises:
- a second subscriber line multiplexer equipped similar to said first subscriber multiplexer;
- a second high rate transmission line coupled to said second subscriber line multiplexer; and
- a plurality of line selector means connected to said plurality of subscriber lines, respectively, for distributing said subscriber lines into said first and said second subscriber line multiplexers;
- each of said plurality of line selector means comprising:
- first, second and third ports;
- a switch means for selectively connecting said first port to one of said second and third ports, said first port being coupled with each one of said plurality of subscriber lines, said second port being coupled with said first subscriber line multiplexer, and said third port being coupled with said second subscriber line multiplexer;
- input means for inputting a selection signal for indicating one of said first and second high rate transmission lines;
- switch control means responsive to said selection signal for controlling said switch means so that each one of said subscriber lines is selectively coupled to one of said first and second subscriber line multiplexers.

* * * * *